US011758361B2

(12) United States Patent
MacKaay et al.

(10) Patent No.: US 11,758,361 B2
(45) Date of Patent: Sep. 12, 2023

(54) INDOOR LOCALIZATION BASED ON ACCELERATION EVENTS

(71) Applicant: T-Mobile USA, Inc., Bellevue, WA (US)

(72) Inventors: Morgan MacKaay, Sammamish, WA (US); Antoine Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/074,279

(22) Filed: Oct. 19, 2020

(65) Prior Publication Data

US 2021/0337353 A1 Oct. 28, 2021

Related U.S. Application Data

(60) Provisional application No. 63/013,722, filed on Apr. 22, 2020.

(51) Int. Cl.
*H04W 4/029* (2018.01)
*H04W 4/02* (2018.01)
*H04W 4/33* (2018.01)

(52) U.S. Cl.
CPC .......... *H04W 4/029* (2018.02); *H04W 4/026* (2013.01); *H04W 4/027* (2013.01); *H04W 4/33* (2018.02)

(58) Field of Classification Search
CPC ....... H04W 4/029; H04W 4/33; H04W 4/026; H04W 4/027
See application file for complete search history.

(56) References Cited

U.S. PATENT DOCUMENTS 8,526,368 B2   9/2013 Finlow-Bates et al.
8,559,975 B2  10/2013 Lin et al.
(Continued)

FOREIGN PATENT DOCUMENTS

CA    3065721 C     8/2022
EP    1115262 A1    7/2001
GB    2574602 A    12/2019

OTHER PUBLICATIONS

(Stable) virtual landmarks: Spatial dropbox to enhance retail experience, Swadhin Pradhan, A. Balashankar, N. Ganguly and B. Mitra, 2014 Sixth International Conference on Communication Systems and Networks (COMSNETS), Bangalore, 2014, pp. 1-8.
(Continued)

*Primary Examiner* — Ernest G Tacsik
(74) *Attorney, Agent, or Firm* — Han Santos, PLLC (57) ABSTRACT

Techniques for locating a user device in an indoor environment include receiving an indication of an acceleration event at a start position and a deceleration event associated with the user device. Based at least on the amount of time elapsed between the acceleration event and the deceleration event, a traveled distance of the user device may be determined. Additionally, sensor data collected from the user device between the acceleration event and the deceleration event may be used to determine the direction of travel of the user device. Following the determination of the traveled distance and the direction of travel, a finish position relative to the start position of the user device in the indoor environment may be mapped using an architectural plan associated with the indoor environment.

18 Claims, 8 Drawing Sheets

(56) References Cited

U.S. PATENT DOCUMENTS

| | | | |
|---|---|---|---|
| 9,301,100 | B1 | 3/2016 | Jampani et al. |
| 10,176,718 | B1 | 1/2019 | Mazuir et al. |
| 11,069,082 | B1 | 7/2021 | Afrouzi et al. |
| 2008/0281839 | A1 | 11/2008 | Bevan et al. |
| 2012/0072110 | A1* | 3/2012 | Venkatraman ........ G01S 5/0252 701/434 |
| 2012/0136623 | A1 | 5/2012 | Edge et al. |
| 2012/0149388 | A1 | 6/2012 | West et al. |
| 2012/0224770 | A1* | 9/2012 | Strassenburg-Kleciak ................. G06K 9/00624 382/165 |
| 2014/0244163 | A1* | 8/2014 | Zhao ..................... H04W 64/00 701/445 |
| 2014/0274151 | A1* | 9/2014 | Pattabiraman ........ H04W 16/18 455/456.3 |
| 2015/0043325 | A1* | 2/2015 | Tsukamoto ............. H04L 43/08 370/216 |
| 2016/0127209 | A1 | 5/2016 | Singh et al. |
| 2016/0302050 | A1* | 10/2016 | Blando ................... H04W 4/02 |
| 2017/0013409 | A1* | 1/2017 | Cerchio ............ H04W 72/0473 |
| 2017/0300973 | A1 | 10/2017 | Jones et al. |
| 2017/0318422 | A1* | 11/2017 | Kokkonen ............... H04W 4/80 |
| 2017/0366943 | A1* | 12/2017 | Yoon ..................... H04W 4/025 |
| 2018/0091946 | A1 | 3/2018 | Venkatraman et al. |
| 2018/0109921 | A1* | 4/2018 | Cerchio ................... H04W 4/02 |
| 2018/0180706 | A1 | 6/2018 | Li et al. |
| 2019/0182627 | A1 | 6/2019 | Thoresen et al. |
| 2019/0375094 | A1* | 12/2019 | Kim ..................... G05D 1/0238 |
| 2020/0018812 | A1* | 1/2020 | Lindquist ............. H04B 17/318 |
| 2020/0228943 | A1* | 7/2020 | Martin ..................... H04W 4/80 |
| 2021/0063163 | A1* | 3/2021 | Huberman ............ G06N 3/0454 |
| 2021/0279417 | A1* | 9/2021 | Delaney ................... G06F 40/30 |

OTHER PUBLICATIONS

Autonomous Robotic Monitoring of Underground Cable Systems; Bing Jiang, Alanson P. Sample, Ryan Wistort, and Alexander Mamishev; 12th International Conference on Advanced Robotics, Sep. 2005, pp. 673-679.

Avoiding multipath to revive inbuilding WiFi localization, Souvik Sen, Jeongkeun Lee, Kyu-Han Kim, and Paul Congdon, ACM MobiSys 2013.

EMSense: Recognizing Handled, Uninstrumented, Electro-Mechanical Objects Using Software-Defined Radio; Gierad Laput, Chouchang (Jack) Yang, Robert Xiao, Alanson P. Sample, and Chris Harrison; ACM User Interface Software and Technology Symposium, Nov. 8-11, 2015.

I am a smartphone and I can tell my user's walking direction, Nirupam Roy, He Wang, and Romit Roy Choudhury, ACM MobiSys 2014.

ID-Match: A Hybrid Computer Vision and RFID System for Recognizing Individuals in Groups; Hanchuan Li, Peijin Zhang, Samer Al Moubayed, Shwetak N. Patel, and Alanson P. Sample; ACM Conference on Human Factors in Computing Systems (CHI), May 7-12, 2016.

IDSense: A Human Object Interaction Detection System Based on Passive UHF RFID; Hanchuan Li, Can Ye, and Alanson P. Sample; ACM Conference on Human Factors in Computing Systems (CHI), Apr. 18-24, 2015.

Last-Mile Navigation Using Smartphones, Yuanchao Shu, Kang G. Shin, Tian He, and Jiming Chen, ACM MobiCom 2018.

No need to war-drive: unsupervised indoor localization, He Wang, Souvik Sen, Ahmed Elgohary, Moustafa Farid, Moustafa Youssef, and Romit Roy Choudhury, ACM MobiSys 2012.

Sail: Single access point-based indoor localization, Alex T Mariakakis, Souvik Sen, Jeongkeun Lee, and Kyu-Han Kim, ACM MobiSys 2014.

Smartphone-based Acoustic Indoor Space Mapping, Swadhin Pradhan, Ghufran Baig, Wenguang Mao, Lili Qiu, Guohai Chen, and Bo Yang; 2018.. Proc. ACM Interact. Mob. Wearable Ubiquitous Technol. 2, 2, Article 75 (Jun. 2018), 26 pages.

Davidson, P. and R. Piche, "A Survey of Selected Indoor Positioning Methods for Smartphones," IEEE Communications Surveys & Tutorials, 2016, 24 pages. https://tutcris.tut.fi/portal/files/11073461/main_2_column.pdf.

Jang, Beakcheol and Hyunjung Kim, "Indoor Positioning Technologies Without Offline Fingerprinting Map: A Survey," IEEE Communications Surveys & Tutorials (vol. 21,Issue: 1, Firstquarter2019), 21 pages. https://ieeexplore.ieee.org/abstract/document/8451859.

Langlois, et al., "Indoor Localization with Smartphones: Harnessing the Sensor Suite i n Your Pocket," IEEE Consumer Electronics Magazine (vol. 6, Issue: 4, Oct. 2017), 1 page. https://ieeexplore.ieee.org/document/8048717.

Simultaneous localization and mapping (2020), 8 pages. https://en.wikipedia.org/wiki/Simultaneous_localization_and_mapping.

Wang, et al., "Indoor-Outdoor Detection Using a Smart Phone Sensor," Sensors (Basel). Oct. 2016; 16(10): 1563, 24 pages. https://www.ncbi.nlm.nih.gov/pmc/articles/PMC5087352/.

U.S. Appl. No. 17/183,715, Office Action dated Jan. 4, 2022, 27 pages.

U.S. Appl. No. 17/192,382, Office Action dated May 24, 2022, 42 pages.

U.S. Appl. No. 17/183,715, Notice of Allowance dated May 4, 2022, 18 pages.

U.S. Appl. No. 17/183,715, Notice of Allowance dated Jun. 13, 2022, 17 pages.

U.S. Appl. No. 17/192,382, Final Office Action dated Aug. 4, 2022, 39 pages.

U.S. Appl. No. 17/225,841, Office Action dated Sep. 23, 2022, 73 pages.

U.S. Appl. No. 17/192,382, Notice of Allowance dated Apr. 13, 2023, 44 pages.

U.S. Appl. No. 17/225,841, Final Office Action dated Feb. 14, 2023, 61 pages.

U.S. Appl. No. 17/967,798, Notice of Allowance dated Apr. 13, 2023, 27 pages.

U.S. Appl. No. 17/192,382, Office Action dated Dec. 8, 2022, 47 pages.

U.S. Appl. No. 17/225,937, Office Action dated Feb. 3, 2023, 66 pages.

U.S. Appl. No. 17/225,841, Non Final Office Action dated Jun. 22, 2023, 73 pages.

* cited by examiner

INDOOR LOCALIZATION BASED ON ACCELERATION EVENTS

CROSS-REFERENCE TO RELATED PATENT APPLICATIONS

This application claims priority to U.S. Provisional Patent Application No. 63/013,722, filed on Apr. 22, 2020, and entitled "Vertical Acceleration for Determining Distance," which is hereby incorporated by reference in its entirety.

BACKGROUND

In many indoor locations such as commercial buildings, it is difficult to provide highly accurate localization of user devices solely using Global Positioning Systems (GPS). Typically, GPS accuracy can vary depending on the surrounding environment and where a user device is located. Similarly, localization techniques using cellular networks can be challenging with varying degrees of accuracy. Additionally, relying on signal availability to perform localization can be problematic when a cellular network fails due to high demand in emergencies. Accordingly, indoor localization presents these nuanced and other challenges of navigating within a complex indoor environment that require a more stringent vertical and horizontal positioning of user devices.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Techniques are disclosed herein for determining a user device's position in an indoor environment. In one aspect, a user device's sensors may be used to determine its position. A combination of sensor fusion may be utilized to make this determination of the user device's position. For instance, the user device may be equipped with an environmental sensor such as an accelerometer that is configured to detect an acceleration event and a deceleration event while the user device is located in an indoor environment such as a commercial building. The user device starts a timer upon detecting an acceleration event (i.e., at $t_1$) and waits until the sensor detects a deceleration event. The user device stops the timer upon detecting the deceleration event (i.e., at $t_2$) and determines the amount of time elapsed between the acceleration event and the deceleration event. The time elapsed may be represented as follows: $t_A = t_2 - t_1$.

The time elapsed may be reported to a location server that is configured to track the position of the user device and to provide location-based services. Upon receiving the time elapsed between the acceleration event and the deceleration event, the location server may determine whether the time elapsed exceeds a predetermined threshold. If the time elapsed exceeds the predetermined threshold, the location server may determine a distance that the user device traveled based at least on the amount of time elapsed between the acceleration event at a start position and the deceleration event. In some aspects, the user device may be equipped with additional environmental sensors such as a gyroscope, magnetic sensors, inertial sensors, optical sensors, and/or other types of sensors for determining, for example, the direction of travel of the user device during the time elapsed. The location server may obtain additional sensor data from these sensors such as the direction of travel of the user device to track the user device's position.

Additionally, the location server may obtain an architectural plan of the indoor environment from a building database. The architectural plan of the indoor environment may include building specifications, blueprints, floor plans, architectural drawings of a building, layouts, and other information associated with the indoor environment. Based on the traveled distance and the direction of travel, the location server may map the finish position of the user device relative to its start position within the indoor environment.

In one example, a user device may travel upwards in an elevator of a building. When the elevator begins ascending, the accelerometer of the user device may detect an acceleration event and the user device may trigger the timer to start. When the elevator slows to a stop, the accelerometer of the user device may detect a deceleration event and the user device may stop the timer. Based at least on the length of time that the user device traveled in the elevator and the vertical direction of travel as indicated by a directional sensor of the user device, the location server may determine that the user device traveled a specific distance in an upward direction. In some aspects, the location server may obtain a building blueprint of the building to determine the distance between each floor of the building to determine the floor level in which the user device is located based on the traveled distance in the direction traveled.

In some aspects, the location server may determine how far a user device has traveled horizontally to determine the position of the user device when the user device has not traveled in a vertical direction. Similar to the example above, the user device may travel in a horizontal direction on a tram from one terminal to another terminal, for example, in an airport. When the tram begins moving, the accelerometer of the user device may detect an acceleration event and the user device may trigger the timer to start. When the tram slows to a stop, the accelerometer of the user device may detect a deceleration event and the user device may stop the timer. Based at least on the length of time that the user device traveled in the tram and the horizontal direction of travel as indicated by a directional sensor of the user device, the location server may determine that the user device traveled a specific distance in a horizontal direction. In some aspects, the location server may obtain a building blueprint of the building to determine the distance between each terminal of the building to determine the terminal in which the user device is located based on the traveled distance in the direction traveled.

Accordingly, the sensor data from user devices, together with information about an indoor environment from external sources, may be leveraged to increase the accuracy of indoor positioning of user devices. The techniques described herein may be implemented in a number of ways. Example implementations are provided below with reference to the following figures.

Example Network Architecture

Figure 1:
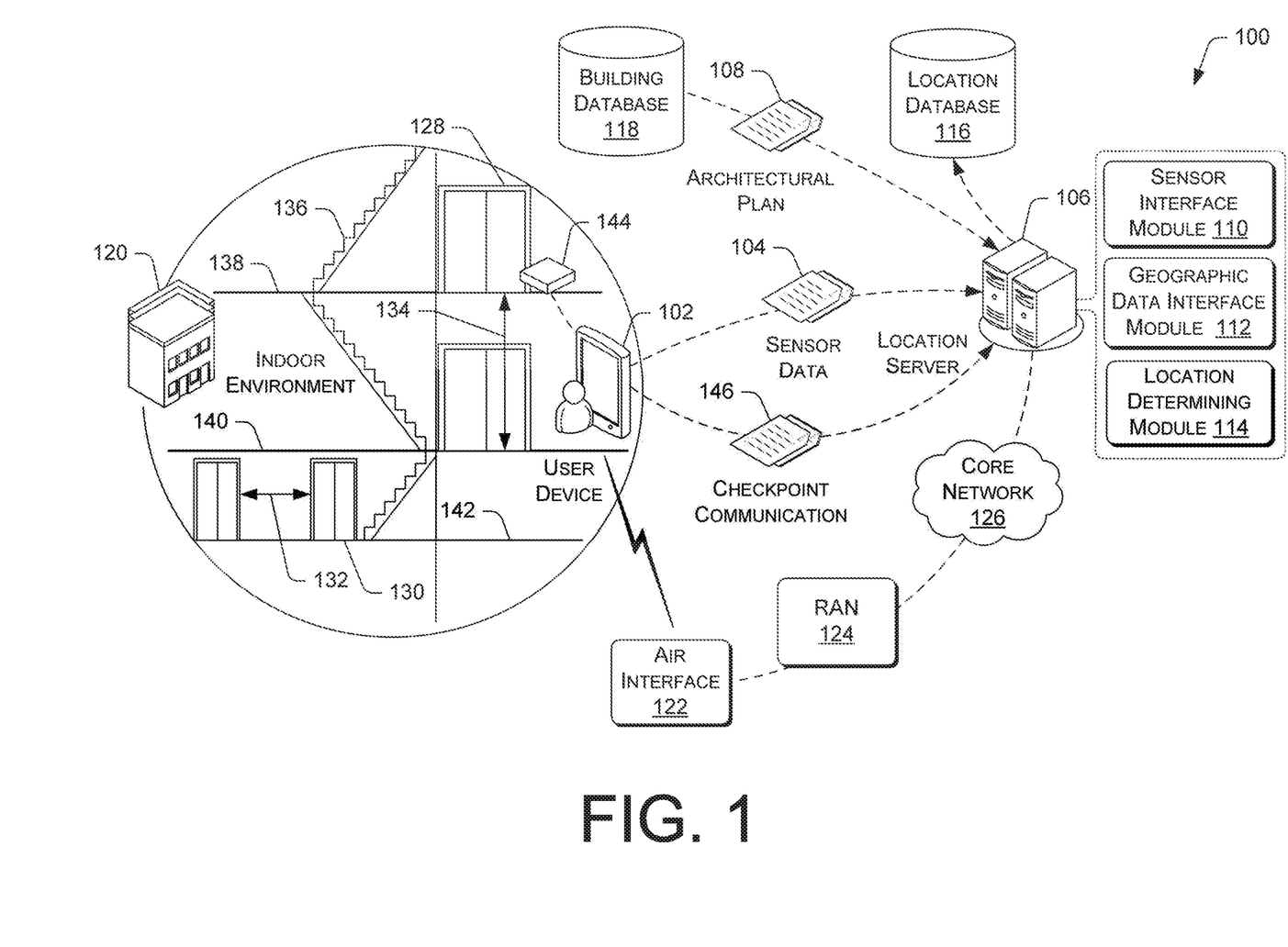
FIG. 1 illustrates an example of network architecture for determining an indoor position of a user device based at least on acceleration and deceleration events of the user device.

FIG. 1 is a high-level system architecture of a network that may be implemented for locating user devices in an indoor environment. The network 100 includes a user device 102 that may be in communication with a location server 106 that is configured to track the position of the user device 102 and to provide location-based services. The user device 102 can include smartphones, mobile devices, personal digital assistants (PDAs), or other electronic devices having a wireless communication function that is capable of receiving input, processing the input, and generating output data. In some aspects, the user device 102 may be equipped with various speed and direction sensors (e.g., an accelerometer, a gyroscope, an inertial sensor, etc.), motion sensors, proximity sensors, image sensors, GPS module, and/or other environmental sensors that can detect, measure, and/or collect changes in the environment of the user device 102 or sensor data such as acceleration, speed, sound, light, directional movement, and/or so forth.

The user device 102 is configured to communicate with an access network (e.g., the RAN 124) over a physical communications interface or layer such as air interface 122 and/or a direct wired connection (not pictured). The air interface 122 can comply with a given cellular communications protocol (e.g., CDMA, EVDO, eHRPD, GSM, EDGE, W-CDMA, LTE, etc.). In other embodiments, additional air interface can comply with a wireless IP protocol (e.g., Wi-Fi, IEEE 802.11). The RAN 124 includes a plurality of access points that serve the user device 102 over air interfaces, such as the air interface 122. The access points in the RAN 120 can be referred to as access nodes (ANs), access points (APs), base stations or BSs, Node Bs, eNode Bs, and so on. These access points can be terrestrial access points (or ground stations), or satellite access points. In some aspects, access points may be separate from the RAN 124. The RAN 124 is configured to connect to a core network 126 that can perform a variety of functions, including bridging circuit switched (CS) calls between user devices served by the RAN 124 and other user devices served by the RAN 124 or a different RAN altogether, and can also mediate an exchange of packet-switched (PS) data with external networks such as the Internet, which includes a number of routing agents and processing agents (not pictured).

Further illustrated in FIG. 1 is the location server 106. As will be described below, the location server 106 may include a sensor interface module 110, a building data interface module 112, and a location determining module 114. The location server 106 may be configured to collect sensor data from the user device 102 via the sensor interface module 110. The location server 106 may be configured to obtain an architectural plan 108 from a building database 118 via the building data interface module 112. The location server 106 may determine the user device's 102 location within an indoor environment 120 via the location determining module 114 based at least on the sensor data 104 and an architectural plan 108 of the indoor environment 120.

In some aspects, the location server 106 may include general-purpose computers, such as desktop computers, tablet computers, laptop computers, servers (e.g., on-premise servers), or other electronic devices that are capable of receiving input, processing the input, and generating output data. The location server 106 can include a plurality of physical machines that may be grouped and presented as a single computing system. Each physical machine of the plurality of physical machines may comprise a node in a cluster. Additionally, or alternatively, the location server 106 may be in the form of virtual machines, such as virtual engines (VE) and virtual private servers (VPS).

The location server 106 may store data in a distributed storage system, in which data may be stored for long periods and replicated to guarantee reliability. The distributed storage system may include the location database 116 and the building database 118. The location database 116 and the building database 118 can comprise a data management layer that includes software utilities for facilitating the acquisition, processing, storing, reporting, and analysis of data. In various embodiments, the building database 118 can be configured with an application program interface (API) that can be called by an application or interface with an API of the application for providing data access.

In FIG. 1, the indoor environment 120 may include a building. In such an example, the building database 118 may store an architectural plan 108 of the indoor environment 120. The architectural plan 108 may include building specifications, blueprints, floor plans, architectural drawings of a building, layouts, and other information associated with the indoor environment 120. Accordingly, the architectural plan 108 may indicate whether the indoor environment 120 includes multiple building units or defined spaces such as floors 138 and 140 and/or terminals 142. The architectural plan 108 may also indicate where different points of ingress and egress 130 (e.g., entrances and exits), stairs or escalators 136, moving walkway systems, elevators 128, hallways, corridors, rooms, and other parts of the indoor environment 120 are located. Additionally, the architectural plan 108 may include information such as dimensions and measurements of spaces (i.e., height, width, length, circumference, etc.) in the indoor environment 120 such as room dimensions, distances between floors, distances between terminals, and/or so forth.

Upon entering, the user device 102 may move within the indoor environment 120. The user device 102 may travel in a vertical direction between the floors 138 and 140 or a horizontal direction between the terminals. The speed and direction sensor (e.g., accelerometer) of the user device 102 is configured to detect an acceleration event as the user device 102 starts to move. Similarly, the speed and direction sensor of the user device 102 is configured to detect a deceleration event as the user device 102 slows down and comes to a stop. Upon detecting an acceleration event, the user device 102 may trigger a timer to start. Conversely, the user device 102 may trigger the timer to stop upon detecting a deceleration event. In response to stopping the timer, the user device 102 may determine the time elapsed between the acceleration event and the deceleration event. The time elapsed may be used to determine the distance traveled 132 and 134. The distance traveled and 132 and 134 may be represented as follows: $s=(\frac{1}{2})at^2$, wherein s is the distance traveled, a is the acceleration, and t is the time elapsed between the acceleration event and the deceleration event.

The time elapsed and the distance traveled together with sensor data such as the direction of travel of the user device 102 may be reported to the location server 106. If the time elapsed is below a predetermined threshold, the location server 106 may determine that the user device's 102 position did not substantially change. If the time elapsed exceeds the predetermined threshold, the location server 106 may calculate the distance traveled 132 and 134. Additionally, the location server 106 may determine that the distance traveled 132 may be a distance traveled in a horizontal direction if the sensor data indicates that the user device 102 traveled in a horizontal direction and/or the elevation of the user device 102 has not changed or has not changed substantially during the time elapsed. The location server 106 may determine that the distance traveled 134 may be a distance traveled in a vertical direction if the sensor data indicates that the user device 102 traveled in a vertical direction and/or the elevation of the user device 102 has changed during the time elapsed. The horizontal and vertical movement of the user device 102 within the indoor environment 120 is further described below in FIGS. 2 and 3, respectively.

Based on the distance traveled and the direction of travel, the location server 106 may determine the current position of the user device 102 within the indoor environment 120. However, before determining the user device's 102 current position, the location server 106 determines the user device's 102 start position. The location server 106 may first confirm that the user device 102 is located within the indoor environment 120. In one aspect, a combination of sensor fusion (e.g., data from the user device's proximity sensor, image sensor, light intensity, Wi-Fi radio, GPS, etc.) and audio echo may be utilized to make this determination of whether the user device 102 is located within the indoor environment 120 or an outdoor environment (not pictured).

Following the determination that the user device 102 is located within the indoor environment 120, the location server 106 may determine the user device's 102 start position based at least on the user device's 102 proximity to known locations of one or more checkpoint devices 144 in the indoor environment 120. In some aspects the checkpoint devices 144 may include Bluetooth listening devices, beacons, Wi-Fi access points, sensors, and/or other such devices. The checkpoint devices 144 can be located at points of ingress and egress 130 such as entrances and exits, point of interest (e.g., directory, customer service desk, restrooms, retail locations, etc.), landmark (e.g., indoor water fountain, recreational area, etc.), and/or other locations such as the elevators 128 and stairs 136 within the indoor environment 120. The locations of the checkpoint devices 144 may be indicated in the architectural plan 108.

The individual checkpoint devices 144 can be associated with a coverage area limited to a certain zone within the indoor environment 120. When the user device 102 is located within a predetermined distance from a checkpoint device 144, the user device 102 may receive a checkpoint communication from the checkpoint device 144. The checkpoint communication can include a checkpoint identifier of the checkpoint device 144 and a checkpoint event time that reflects when the user device 102 received the checkpoint communication. Additionally, the checkpoint communication may include a set of geolocation coordinates (e.g., a longitude, a latitude, and an elevation above sea level) associated with the checkpoint device 144. In one aspect, the user device 102 may relay the checkpoint communication to the location server 106. In response to determining that the user device 102 is in proximity to a checkpoint device, the location server 106 may establish the location of the checkpoint device as the start position of the user device 102.

For example, the user device 102 may receive a checkpoint communication from a checkpoint device that is located at a ground floor elevator and transmit the checkpoint communication to the location server 106. In turn, the location server 106 may determine that the user device's 102 start position is the ground floor elevator. In some aspects, position calibration can be performed based at least on an acceleration vector measured by the user device 102. For example, the user device 102 may be positioned at an elevator shaft when a large vertical acceleration is measured. The user device 102 may subsequently travel in a vertical direction from the start position. Upon determining the distance traveled based at least on the time elapsed between an acceleration event (i.e., when the elevator began ascending) and a deceleration event (i.e., when the elevator began slowing down) and the direction of travel, the location server 106 may map a finish position of the user device 102 relative to the start position in the indoor environment 120.

In some aspects, the architectural plan 108 may indicate the distances between each floor 138 and 140 of the indoor environment 120. Accordingly, the location server 120 may determine the floor on which the user device 102 is located based at least on the distance traveled and the distances between each floor 138 and 140. Additionally, or alternatively, if the architectural plan 108 does not indicate the distances between each floor 138 and 140, the location server 120 may determine the distances between each floor 138 and 140 based on crowdsourced data aggregated from multiple user devices. In one example, crowdsourced data may indicate that user devices in ascending or descending elevators stop every 15 feet. In this case, the location server 120 may determine that the user device 120 goes up or down a floor for every 15 feet traveled, and therefore the distances between each floor is approximately 15 feet. The crowdsourced data and/or building data (e.g., distance between floors) that are generated based at least on the crowdsourced data can be associated with the architectural plan 108.

In some aspects, the location server 120 may determine the indoor environment 120 in which the user device 102 is located based at least on crowdsourced data such as distances traveled between each floor or crowdsourced acceleration vector field data. In one example, various machine learning techniques may be implemented to associate data from the user device 102 with the crowdsourced data and the architectural plan 108 of the indoor environment 120.

Figure 2:
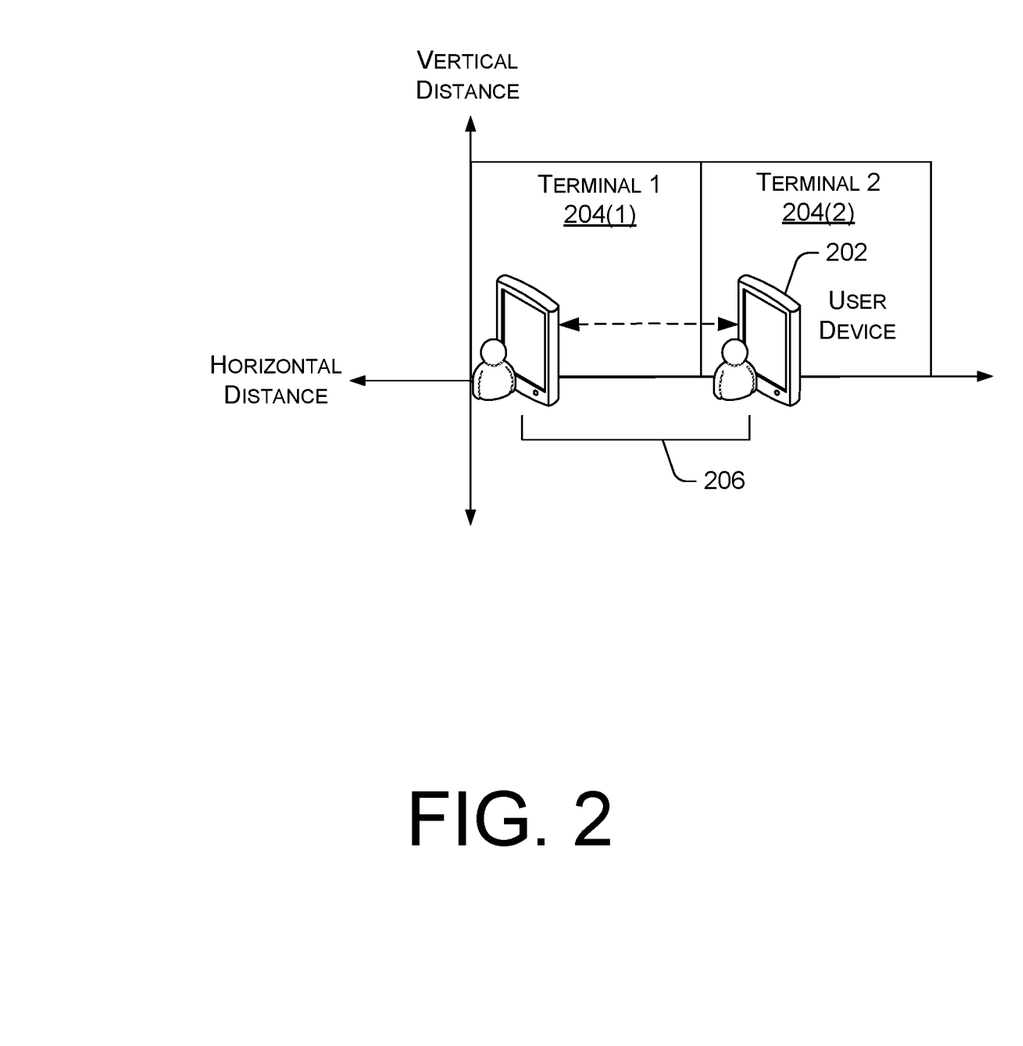
FIG. 2 is a diagram showing a user device moving in a horizontal direction from a first terminal to a second terminal.

FIG. 2 is a diagram showing a user device moving in a horizontal direction to different terminals in the indoor environment 120 of FIG. 1. While FIG. 2 depicts terminals, other embodiments may include rooms, defined spaces (e.g., via a physical or nonphysical boundaries or borders), building sections, and/or other areas of an indoor environment 120. In the illustrated embodiment, the indoor environment may include a building with a first terminal 204(1) (e.g., the main terminal) and a second terminal 204(2). In other embodiments, the indoor environment may include a building with fewer or more terminals. The user device 202 may move from the first terminal 204(1) to the second terminal 204(2) and vice versa in a horizontal direction. In some aspects, the user device 202 may travel in a substantially horizontal direction via a tram or a moving walkway system that moves along the horizontal axis.

When entering a tram or a moving walkway, the user device 202 may receive a checkpoint communication from a checkpoint device that is located at the entrance doors of the tram or the starting point of the moving walkway. In some aspects, position calibration can be performed based on an acceleration vector measured by the user device 202. For instance, the user device 202's start position may correspond to the entrance doors of the tram or the starting point of the moving walkway when specific acceleration vector is measured for a specific period of time. In one example, the user device 202 may enter the tram or the moving walkway in the first terminal 204(1). The user device 202 may relay the checkpoint communication to the location server, such as the location server 106 of FIG. 1. Based on the user device's 202 proximity to the checkpoint device as indicated in the checkpoint communication, the location server may determine that the start position of the user device 202 may correspond to the entrance doors of the tram or the starting point of the moving walkway in the first terminal 204(1).

The user device 202 may detect an acceleration event at the start position as the tram or the moving walkway begins to move. In response, the user device 202 may trigger its timer to start timing. As the tram or the moving walkway comes to a stop, the user device 202 may detect a deceleration event and trigger the timer to stop. The time elapsed between the acceleration event and the deceleration event is used to determine the traveled distance 206. The location server may identify the terminal (i.e., the second terminal 204(2)) corresponding to the finish position of the user device 202 based at least on the traveled distance 206 and the distance between the terminals 204(1) and 204(2). In some aspects, the location server may also identify the terminal corresponding to the finish position of the user device 202 based at least on the direction of travel.

Figure 3:
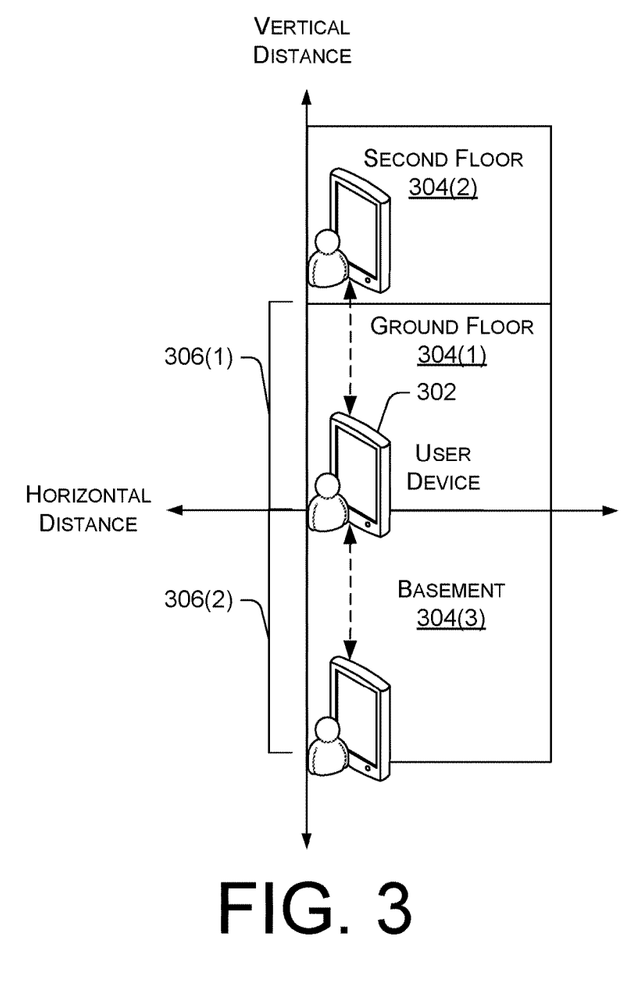
FIG. 3 is a diagram showing a user device moving in a vertical direction from a ground floor to a second floor or a basement.

FIG. 3 is a diagram showing a user device 302 moving in a vertical direction from a ground floor to a second floor or a basement in the indoor environment 120 of FIG. 1. In the illustrated embodiment, the indoor environment may include a commercial or residential multi-level building with a ground floor (i.e., first floor) 304(1), a top floor 304(2), and a basement (i.e., below-ground level) 304(3). The user device 302 may move between the floors 304(1)-304(3) in a vertical direction. In some aspects, the user device 202 may travel in a substantially vertical direction via an elevator or an escalator.

When entering an elevator or an escalator, the user device 302 may receive a checkpoint communication from a checkpoint device that is located at the landing doors of the elevator or the starting point of the escalator. In one example, the user device 302 may enter the elevator or the starting point of the escalator on the ground floor 304(1). The user device 302 may relay the checkpoint communication to the location server, such as the location server 106 of FIG. 1. Based on the user device's 302 proximity to the checkpoint device as indicated in the checkpoint communication, the location server may determine that the start position of the user device 302 may correspond to the landing doors of the elevator or the starting point of the escalator on the ground floor 304(1).

The user device 302 may detect an acceleration event at the start position as the elevator or the escalator begins to move. In response, the user device 302 may trigger its timer to start timing. As the elevator or the escalator comes to a stop, the user device 302 may detect a deceleration event and trigger the timer to stop. The time elapsed between the acceleration event and the deceleration event is used to determine the traveled distance 306(1) and 306(2).

Continuing with the example above, the user device 302 may travel from the ground floor 304(1) to the top floor 304(2) via an elevator. The time elapsed between the acceleration event and the deceleration event is used to determine the traveled distance 306(1). The location server may identify the floor (i.e., the top floor 304(2)) corresponding to the finish position of the user device 302 based on the traveled distance 306(1) and the distance between the ground floor 304(1) and the top floor 304(2).

In another example, the user device 302 may travel from the ground floor 304(1) to the basement 304(3) via the elevator. The time elapsed between the acceleration event and the deceleration event is used to determine the traveled distance 306(2). The location server may identify the floor (i.e., the basement 304(3)) corresponding to the finish position of the user device 302 based on the traveled distance 306(2) and the distance between the ground floor 304(1) and the basement 304(3).

In yet another example, the user device 302 may travel from the top floor 304(2) to the basement 304(3) via the elevator. The time elapsed between the acceleration event and the deceleration event is used to determine the traveled distance 306(3). The distance between the top floor 304(2) and the basement 304(3) may be approximately the sum of the distance between the top floor 304(2) and the ground floor 304(1) and the distance between the ground floor 304(1) and the basement 304(3). The distance between the top floor 304(2) and the ground floor 304(1) and the distance between the ground floor 304(1) and the basement 304(3) may be substantially equal or different. Accordingly, the location server may identify the floor corresponding to the finish position of the user device 302 based on the traveled distance 306(3) and the distance between the top floor 304(2) and the basement 304(3). In some aspects, the location server may also identify the floor corresponding to the finish position of the user device 302 based at least on the direction of travel.

Example Computing Device Components

Figure 4:
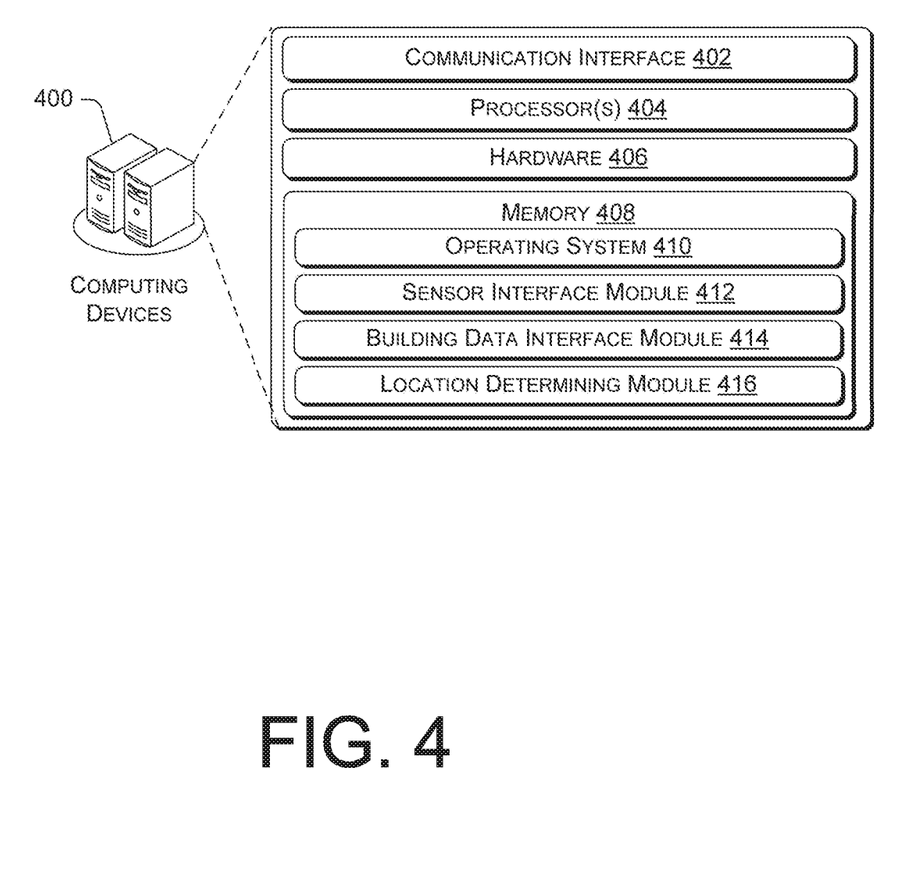
FIG. 4 is a block diagram showing various components of an illustrative computing device that implements indoor positioning of user devices.

FIG. 4 is a block diagram showing various components of illustrative computing devices 400, wherein the computing device can comprise a location server of FIG. 1. It is noted that the computing devices 400 as described herein can operate with more or fewer of the components shown herein. Additionally, the computing devices 400 as shown herein or portions thereof can serve as a representation of one or more of the computing devices of the present system.

The computing devices 400 may include a communication interface 402, one or more processors 404, hardware 406, and memory 408. The communication interface 402 may include wireless and/or wired communication components that enable the computing devices 400 to transmit data to and receive data from other networked devices. In at least one example, the one or more processor(s) 404 may be a central processing unit(s) (CPU), graphics processing unit(s) (GPU), both a CPU and GPU, or any other sort of processing unit(s). Each of the one or more processor(s) 404 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 404 may also be responsible for executing all computer applications stored in the memory, which can be associated with common types of volatile (RAM) and/or nonvolatile (ROM) memory. The hardware 406 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory 408 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 408 may also include a firewall. In some embodiments, the firewall may be implemented as hardware 406 in the computing devices 400.

The processors 404 and the memory 408 of the computing devices 400 may implement an operating system 410, a sensor interface module 412, a building data interface module 414, and a location determining module 416. The operating system 210 may include components that enable the computing devices 400 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The sensor interface module 412, the building data interface module 414, and the location determining module 416 may include routines, program instructions, objects, and/or data structures that perform particular tasks or implement particular abstract data types. For example, the sensor interface module 412 may include one or more instructions, which when executed by the one or more processors 404 direct the computing devices 400 to perform operations related to receiving and processing sensor data generated by a user device. The sensor data may include image data, signal strength, directional data, audio echo data, light intensity data, proximity data, Wi-Fi data, GPS coordinates, and/or other sensor data that may be indicative of or can be used to determine the user device's position. Accordingly, the sensor interface module 412 may capture, for example, acceleration and deceleration activities, angle, tilt, or other movement information of the user device. The sensor interface module 412 may also receive reported time elapsed between the user device's acceleration event and the deceleration event. Additionally, the sensor interface module 412 may capture checkpoint communications from the user device, which may indicate the user device's proximity to one or more checkpoint devices in an indoor environment. The sensor interface module 412 may also provide reported time elapsed, sensor data, checkpoint communications, and/or other related data to the location determining module 416 for determining the position of the user device.

The building data interface module 414 may include one or more instructions, which when executed by the one or more processors 404, direct the computing devices 400 to perform operations related to receiving, processing, and presenting building data from a building database. The building data interface module 414 may obtain an architectural plan of an indoor environment from a building database and/or other data sources. The architectural plan of the indoor environment may include building specifications, blueprints, floor plans, architectural drawings of a building, and other information associated with the indoor environment. The building data interface module 414 may also extract certain information about the indoor environment from the architectural plan and pass on the information to the location determining module 416. For example, the building data interface module 414 may identify locations of checkpoint devices in the architectural plan. Accordingly, the building data interface module 414 may identify the location of a checkpoint device that is associated with the received checkpoint communications.

In some embodiments, the building data interface module 414 may include a workflow scheduler that periodically checks for and retrieves newly available data from the building database. The workflow scheduler may handle the extraction and the handling of the data based on configurable policies. For example, a configurable policy may specify the source data location, frequency of data retrieval, handling procedures for late arrival data, data retention period, and data disposal following an expiration of the data retention period. The handling procedures for the late arrival data may specify a predetermined cutoff period during which any data arriving late may be incorporated with data that is retrieved on time for processing. In some implementations, the building data interface module 414 may employ the file transfer protocol (FTP), the Hypertext Transfer Protocol Secure (HTTP) and/or other secure data transfer protocols to obtain data from the building database, as well as pass information to the location determining module 416. In at least one embodiment, the building data interface module 414 may perform data integrity tests to verify that the content of the received data files are not corrupt.

The location determining module 416 may include one or more instructions, which when executed by the one or more processors 404, direct the computing devices 400 to perform operations related to receiving, processing, and presenting location data of a user device to a location database. In some aspects, the location determining module 416 may be configured to determine a user device's real-time location in an indoor environment. For example, the location determining module 416 may determine the traveled distance of the user device based on the reported time elapsed between the user device's acceleration event and deceleration event. If the reported time elapsed does not exceed a predetermined threshold, the location determining module 416 may assume that the position of the user device did not substantially change between the user device's acceleration event and the deceleration event.

The location determining module 416 may also determine the user device's start position based at least on the checkpoint communications. In some aspects, the location determining module 416 may map the location of a checkpoint device that is associated with the received checkpoint communications. Upon mapping the location of the checkpoint device, the location determining module 416 may establish the location of the checkpoint device as the user device's start position based on the user device's proximity to the location of the checkpoint device as indicated in the user device's sensor data (e.g., proximity data). The location determining module 416 may display the user device's position by way of a marker on a digital architectural plan or a map presented on a visual display that is generated using geospatial map data, data from the building database 118 of FIG. 1, and/or so forth. In some embodiments, the location determining module 416 may also provide navigation directions to direct a user to the current location of a user device based on the sensor data generated by the user device. For example, the location determining module 416 may generate and provide navigation instructions to a user based at least on a navigated route of the user device from the start position and the finish position. Additionally, the location determining module 416 may implement a notification component for broadcasting the current position of the user device to an additional user device in response to an emergency notification associated with the indoor environment. In various embodiments, the location determining module 416 may provide and broadcast the data to multiple user devices via a secure data transfer protocol.

Figure 5:
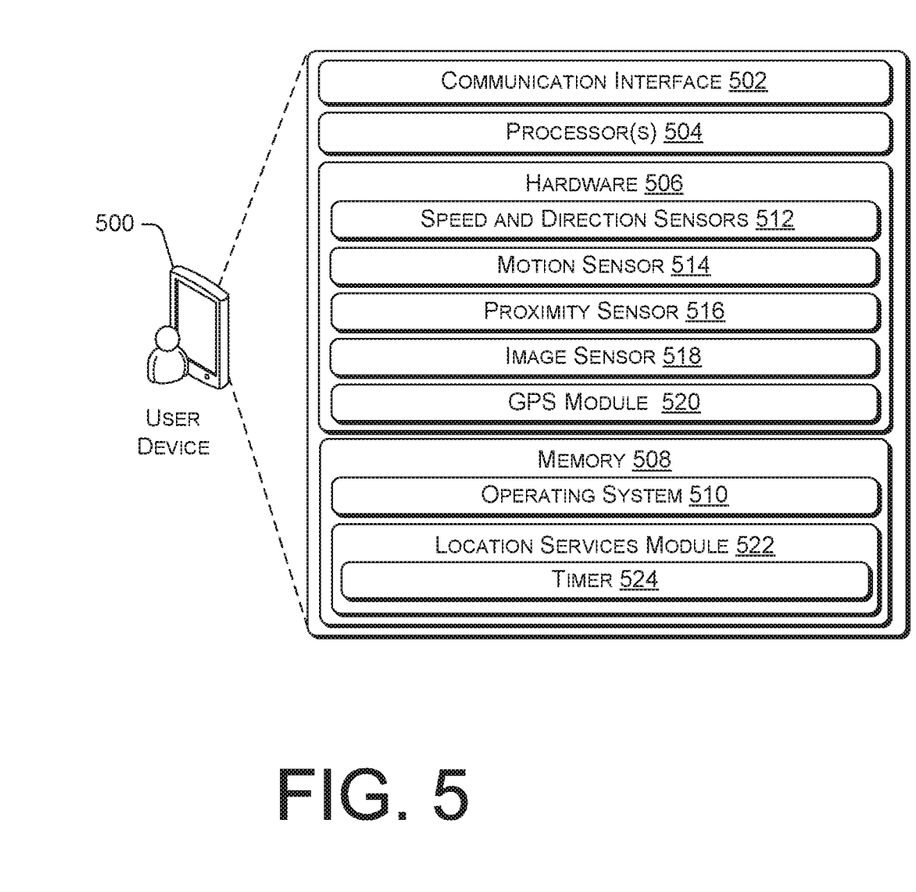
FIG. 5 is a block diagram showing various components of an illustrative user device that is configured to send sensor data to a location server.

FIG. 5 is a block diagram showing various components of an illustrative user device 500, wherein the user device 500 can comprise any number of mobile devices as depicted in FIG. 1. It is noted that the user device 500 as described herein can operate with more or fewer of the components shown herein. Additionally, the user device 500 as shown herein or portions thereof can serve as a representation of one or more of the user devices of the present system.

The user device 500 may include a communication interface 502, one or more processors 504, hardware 506, and memory 508. The communication interface 502 may include wireless and/or wired communication components that enable the user device 500 to transmit data to and receive data from other networked devices. In at least one example, the one or more processor(s) 504 may be a central processing unit(s) (CPU), graphics processing unit(s) (GPU), both a CPU and GPU, or any other sort of processing unit(s). Each of the one or more processor(s) 504 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 504 may also be responsible for executing all computer applications stored in the memory, which can be associated with common types of volatile (RAM) and/or nonvolatile (ROM) memory. The hardware 506 may include additional user interface, data communication, or data storage hardware. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The data input devices may also include various sensors. For example, the sensors can include a speed and direction sensor 512, a motion sensor 514, a proximity sensor 516, an image sensor 518, and a GPS module 520. The speed and direction sensor 512 is a sensor that is configured to measure the speed at which the user device 500 is traveling. The speed and direction sensor may obtain an indication of the speed of the user device 500 using one or more motion indicia. The indication of the speed of the user device 500 may be compared against an initial threshold that may be indicative of an upper bound for pedestrian traffic. Depending upon the indicium used, obtaining the indication itself may inherently involve a comparison against the initial threshold. If the indication is less than or equal to the initial threshold, then a further indication of the speed of the user device 500 may be obtained by the speed and direction sensor 512.

The speed and direction sensor 512 is also configured to determine the direction of travel of the user device 500. In this regard, the speed and direction sensor 512 may include a compass, magnetic sensor, and/or other such components for tracking the direction of the user device 500. While the user device 500 is depicted as comprising the speed and direction 512, it may be appreciated that other embodiments implement or utilize other types of sensors such as an accelerometer, a gyroscope, and an inertial sensor, and/or so forth.

The motion sensor 514 is a sensor that is configured to detect and generate motion sensor signals in response to rotations and/or movements of the user device 500. The motion sensor 514 may sense a rotation angle of the user device 500 and responsively send out a rotation sensing signal. In some aspects, the motion sensor 514 may be pre-set with a threshold angle and embedded with an algorithm for receiving the detected rotation angle to calculate whether the detected rotation angle is greater than the threshold angle. When the detected rotation angle is greater than the threshold angle, the motion sensor 514 may be configured to send out the rotation sensing signal.

The proximity sensor 516 is a sensor that is configured to determine whether there is an external object within a certain distance of the user device 500. In one example, the proximity sensor 516 may detect that the user device 500 is close to a checkpoint device. In response, the user device 500 may receive a checkpoint communication from the checkpoint device.

The image sensor 518 is a sensor that is configured to capture and store images of the physical world. In some embodiments, the image sensor 518 may be a camera. In some embodiments, the image sensor 518 may be a Red-Green-Blue (RGB) sensor that is used to capture information about light intensity, red color temperature, green color temperature, and blue color temperature. While the user device 500 is depicted as comprising the image sensor 518, it may be appreciated that other embodiments utilize other types of sensors such as RGB-white (RGBW) sensor, (luma, U chrominance, and V chrominance) sensor, optical sensors, and/or so forth. The GPS module 520 is hardware that is configured to determine the physical location of the user device 500 according to a GPS protocol. The GPS module 520 may provide longitude, latitude, elevation, and/or other coordinates.

The memory 508 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multi-media/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 508 may also include a firewall.

The processors 504 and the memory 508 of the user device 500 may implement an operating system 510, and location services module 518. The operating system 510 may include components that enable the user device 500 to receive and transmit data via various interfaces (e.g., user controls, communication interface, and/or memory input/output devices), as well as process data using the processors 504 to generate output. The operating system 510 may include a presentation component that presents the output (e.g., display the data on an electronic display, store the data in memory, transmit the data to another electronic device, etc.). Additionally, the operating system 510 may include other components that perform various additional functions generally associated with an operating system.

The location services module 518 may include one or more instructions, which when executed by the one or more processors 504 direct the user device 500 to perform operations related to receiving an indication of an acceleration event and a deceleration event from the speed and direction sensor 512. In response to receiving an indication of an acceleration event, the location services module 518 may trigger a timer 524 to start. Subsequently, in response to receiving an indication of a deceleration event, the location services module 518 triggers the timer 524 to stop. Upon stopping the timer 524, the location services module 518 may determine the amount of time elapsed between the acceleration event and the deceleration event.

Additionally, the location services module 518 may include a sensor data management layer that is configured to facilitate the acquisition, processing, storing, reporting, and analysis of sensor data. In one example, the location services module 518 may be configured to record the position of the user device 500 in response to detecting proximity to a checkpoint device and receiving a checkpoint communication from the checkpoint device. Additionally, the location services module 518 may be configured to report the time elapsed to the location server. In other examples, the location services module 518 may receive a request, from the location server, to provide sensor data that may be indicative of the user device's movement.

In some aspects, the location services module 518 may implement a navigation component for receiving a user input that comprises a request to navigate to a destination and receiving navigation instructions from a location server. The destination may be a point of interest (e.g., directory, customer service desk, restrooms, retail locations, etc.) that is located within the indoor environment in which the user device 500 is located. The navigation instructions may be presented to a user via the location services module 518. The navigation component may be a component of the location services module 518 or a component of a separate navigation application that resides in the user device 500, depending upon embodiments.

Example Processes

Figure 6:
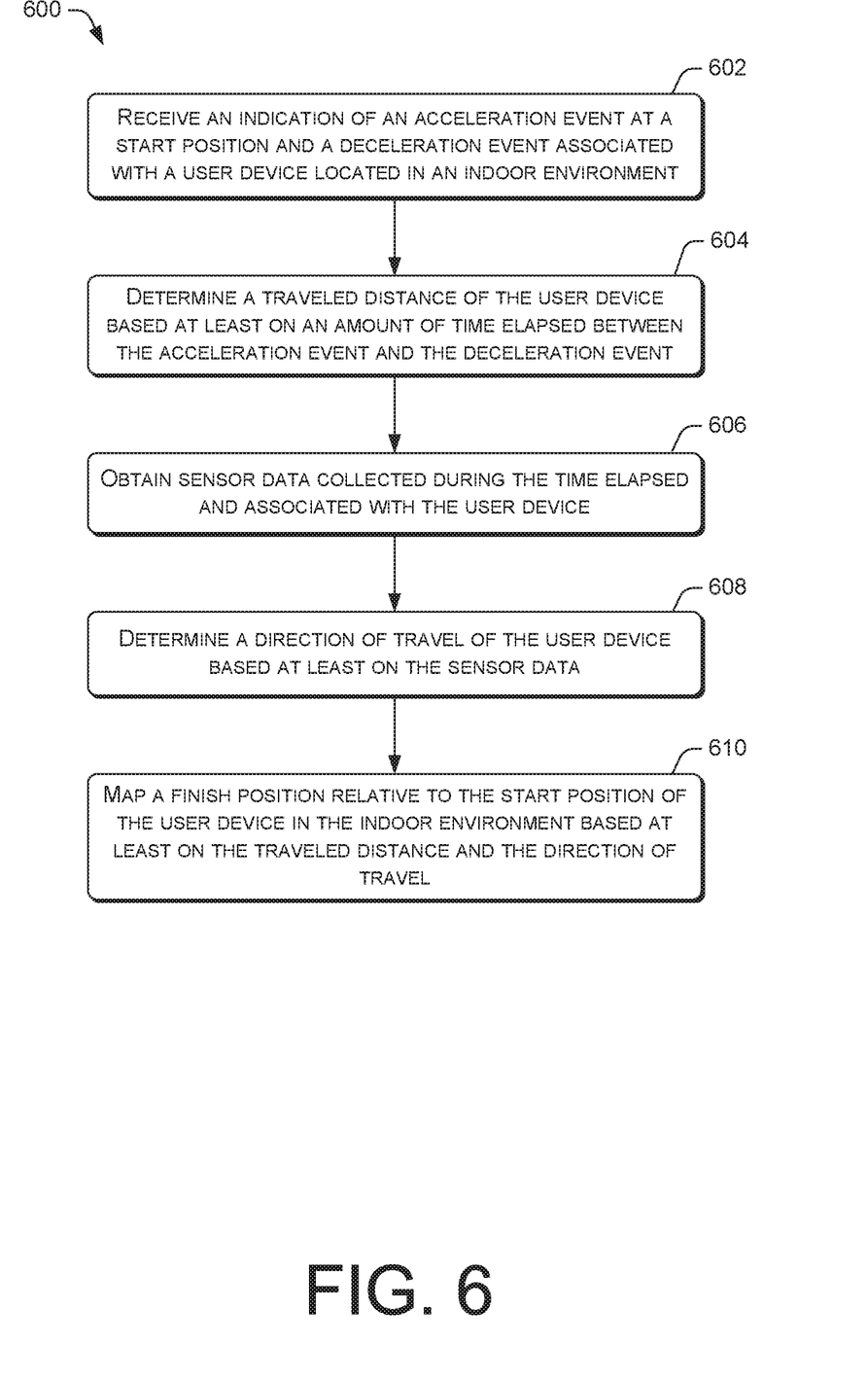
FIG. 6 is a flow diagram of an example process for locating a user device in an indoor environment.
Figure 7:
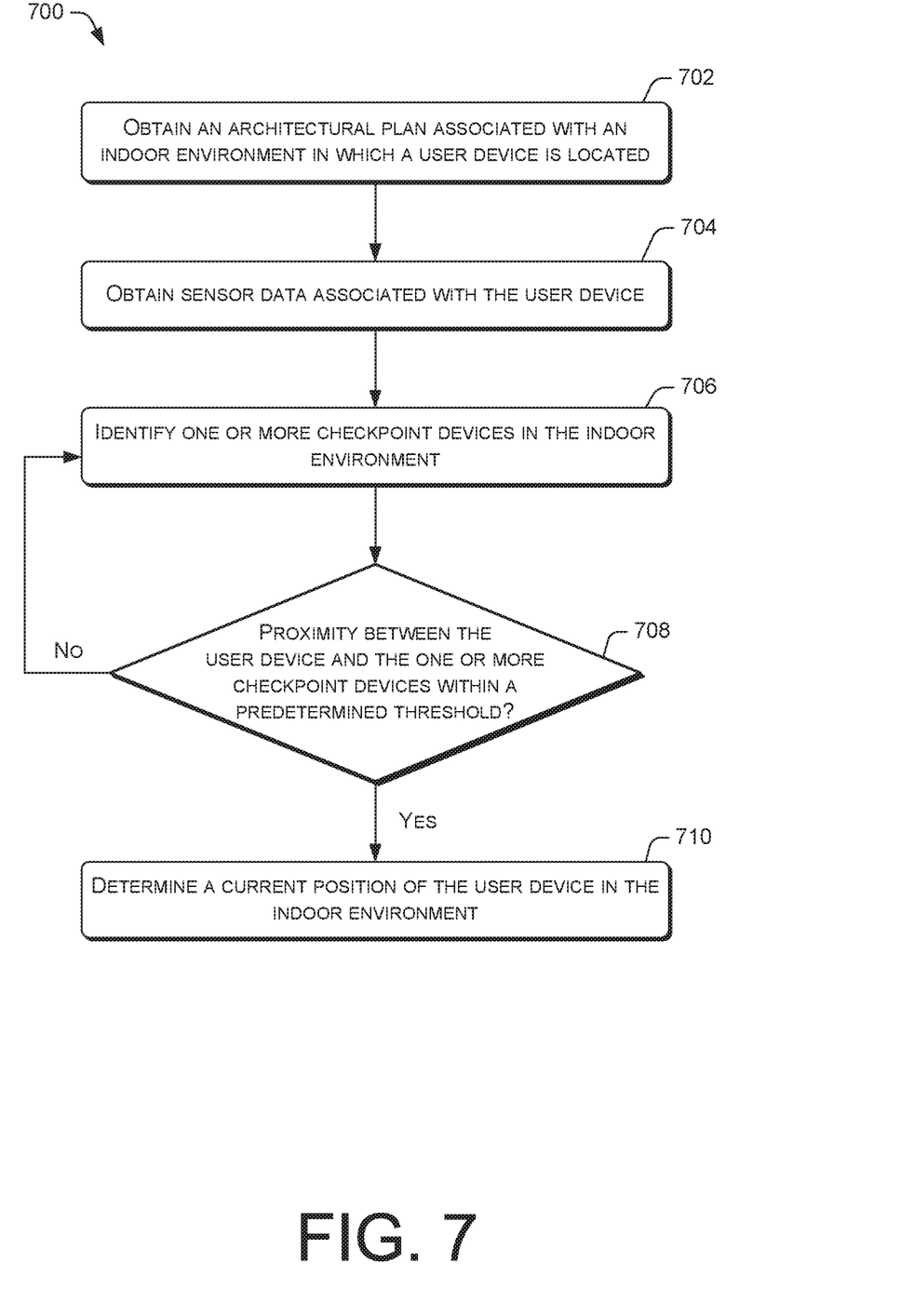
FIG. 7 is a flow diagram of an example process for locating a user device in an indoor environment based at least on checkpoint devices located throughout the indoor environment.
Figure 8:
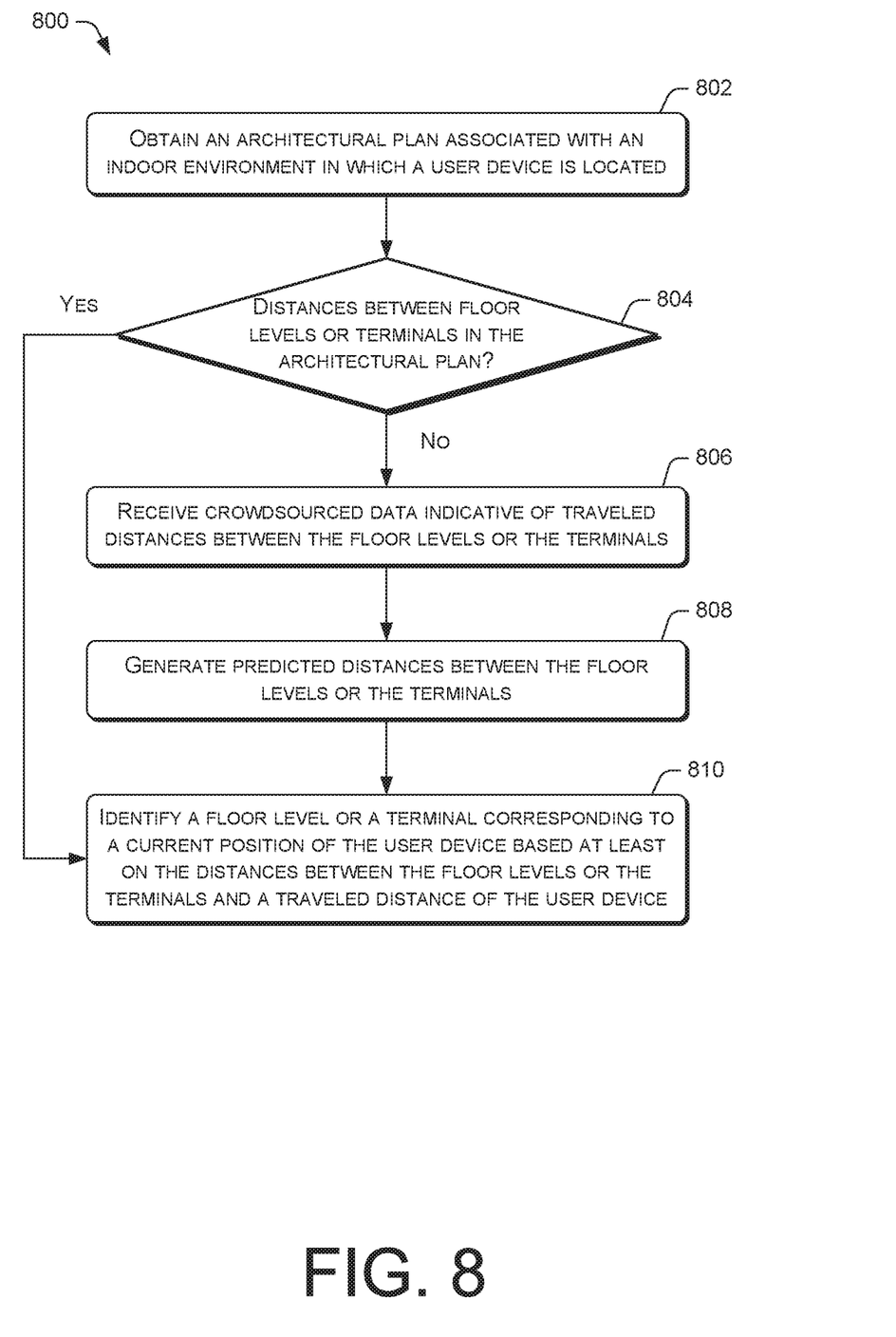
FIG. 8 is a flow diagram of an example process for locating a user device in an indoor environment based at least on crowdsourced data.

FIGS. 6-8 show flow diagrams of example processes for locating user devices in an indoor location. The processes 600-800 are illustrated as a collection of blocks in logical flow charts, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 600-800 are described with reference to FIGS. 1-5.

FIG. 6 is a flow diagram of an example process 600 for locating a user device in an indoor environment. At block 602, a location server may receive an indication of an acceleration event at a start position and a deceleration event associated with a user device located in an indoor environment. The user device may be equipped with one or more sensors such as a speed and direction sensor that is configured to detect the acceleration event and the deceleration event. In some aspects, the start position of the user device may correspond to a checkpoint device that is located in the indoor environment. At block 604, the location server may determine a traveled distance of the user device based at least on an amount of time elapsed between the acceleration event and the deceleration event. In some aspects, the location server may determine that the traveled distance of the user device is negligible if the time elapsed does not exceed a predetermined threshold.

At block 606, the location server may obtain sensor data collected during the time elapsed and associated with the user device. In some aspects the sensor data can include image data, signal strength, directional data, audio echo data, light intensity data, proximity data, Wi-Fi data, and/or so forth. At block 608, the location server may determine a direction of travel of the user device based at least on the sensor data. For example, the direction of travel can indicate whether the user device is traveling in a vertical direction or a horizontal direction. At block 610, the location server may map a finish position relative to the start position of the user device in the indoor environment based at least on the traveled distance and the direction of travel. In some aspects, the location server may display the user device's position by way of a marker on an architectural plan or a map. The architectural plan or the map can be displayed on the user device or another user interface. Accordingly, the location server may also provide navigation directions to direct a user from the finish position to a desired location in the indoor environment.

FIG. 7 is a flow diagram of an example process 700 for locating a user device in an indoor environment based at least on checkpoint devices located throughout the indoor environment. At block 702, a location server may obtain an architectural plan associated with an indoor environment in which a user device is located. The architectural plan of the indoor environment may include building specifications, blueprints, floor plans, architectural drawings of a building. The architectural plan may be obtained from a building database or other data sources. At block 704, the location server may obtain sensor data associated with the user device. The user device may be equipped with one or more sensors such as speed and direction sensors, proximity sensors, and/or so forth. The sensor data may be collected via the user device scheduled intervals. Additionally, or alternatively, the sensor data may be collected between an acceleration event and a deceleration event that is associated with the user device.

At block 706, the location server may identify one or more checkpoint devices in the indoor environment as indicated in the architectural plan. The individual checkpoint devices can be associated with a coverage area limited to a certain zone within the indoor environment. Additionally, the individual checkpoint devices may be associated with a unique checkpoint device identifier. At decision block 708, the location server may determine whether the proximity between the user device and the one or more checkpoint devices is within a predetermined threshold. If the user device is located within a predetermined distance from the one or more checkpoint devices ("yes" at block 708), the location server may determine a current position of the user device in the indoor environment, as indicated in block 710. In some aspects, the current position of the user device may correspond to the start position of the user device at the acceleration event. If the user device is not located within the predetermined distance from the one or more checkpoint devices ("no" at block 708), the process may return to block 706 and the location server may continue to identify checkpoint devices in the indoor environment that may be located near the user device.

FIG. 8 is a flow diagram of an example process 800 for locating a user device in an indoor environment based at least on crowdsourced data. At block 802, a location server may obtain an architectural plan associated with an indoor environment in which a user device is located. The location server may identify the indoor environment in which the user device is located via one or more sensor data obtained from the user device. For example, the location server may identify the indoor environment based on the GPS coordinates from the user device. In some examples, the architectural plan may be obtained from a building database or other data sources.

At decision block 804, the location server may determine whether the architectural plan specifies distances between floor levels or terminals. If the architectural plan does not specify the distances between the floor levels or the terminals ("no" from block 804), the location server may receive crowdsourced data indicative of traveled distances between the floor levels or the terminals, as indicated in block 806. For example, the crowdsourced data from one or more user devices that are located in the indoor environment may indicate that the user devices stop every 15 feet when traveling in a vertical direction via an elevator. Accordingly, the distance between each floor may be approximately 15 feet. The actual distance between each floor may vary depending on the joist width, subflooring, flooring, framing, and/or so forth. Similarly, the crowdsourced data from one or more user devices in the indoor environment may indicate that the user devices stop every 500 feet when traveling in a horizontal direction via a tram. Accordingly, the distance between each terminal may be approximately 500 feet. The actual distance between each terminal may vary depending on the drywall, building frame, and/or so forth. In some aspects, crowdsourced data, including crowdsourced acceleration vector field data can be associated with the architectural plan.

At block 808, the location server may generate predicted distances between the floor levels or the terminals based at least on the crowdsourced data. The predicted distances between the floor levels or the terminals may be appended to the architectural plan and stored in the building database. If the architectural plan specifies the distances between the floor levels or the terminals ("yes" from block 804), the location server may identify a floor level or a terminal corresponding to a current position of the user devices based at least on the distances between the floor levels or the terminals, a traveled distance of the user device, and a direction of travel of the user device, as indicated in block 810. For example, the location server may determine that the current position of the user device is on the top floor if the distance between the ground floor and the top floor is approximately 15 feet and the traveled distance is approximately 15 feet.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more non-transitory computer-readable media storing computer-executable instructions that upon execution cause one or more processors to perform acts comprising:

using a combination of an image sensor, light intensity, Wi-Fi radio, and a proximity sensor to determine that a user device is within an indoor environment;

determining a start position of the user device based at least on the user device's proximity to known locations of one or more checkpoint devices in the indoor environment;

receiving an indication of an acceleration event at the start position and a deceleration event at a finish position associated with the user device that is located in the indoor environment;

determining a traveled distance of the user device based at least on an amount of time elapsed between the acceleration event and the deceleration event;

obtaining sensor data collected during the time elapsed and associated with the user device;

determining a direction of travel of the user device based at least on the sensor data;

mapping, using an architectural plan associated with the indoor environment, the finish position relative to the start position of the user device in the indoor environment based at least on the traveled distance and the direction of travel;

predicting, using crowdsourced data aggregated from multiple user devices in the indoor environment, distances between floors in the indoor environment;

appending the predicted distances between floors to the architectural plan associated with the indoor environment; and identifying a floor level corresponding to the finish position of the user device based at least on:
the start position,
the predicted distances between the floor levels or the terminals,
the traveled distance of the user device, and
the direction of travel of the user device.

2. The one or more non-transitory computer-readable media of claim 1, wherein the acts further comprise:
obtaining the architectural plan associated with the indoor environment;
identifying a number of floor levels in the indoor environment based at least on the architectural plan, wherein the number of floor levels is greater than one; and
determining distances between consecutive floor levels.

3. The one or more non-transitory computer-readable media of claim 1, wherein the acts further comprise:
obtaining the architectural plan associated with the indoor environment;
identifying a number of terminals in the indoor environment based at least on the architectural plan, wherein the number of terminals is greater than one;
determining distances between consecutive terminals; and
identifying a terminal corresponding to the finish position based at least on the distances between the consecutive terminals, the traveled distance, and the direction of travel.

4. The one or more non-transitory computer-readable media of claim 1, wherein the acts further comprise:
obtaining the architectural plan associated with the indoor environment;
identifying a number of terminals in the indoor environment based at least on the architectural plan, wherein the number of terminals is greater than one;
receiving the crowdsourced data indicative of traveled distances between the terminals from a plurality of user devices located in the indoor environment; and
identifying a terminal corresponding to the finish position based at least on the predicted distances between the consecutive terminals, the traveled distance, and the direction of travel.

5. The one or more non-transitory computer-readable media of claim 1, wherein the acts further comprise:
determining whether the time elapsed is below a predetermined threshold; and
in response to the time elapsed that is below the predetermined threshold, determining that the start position is the same as the finish position.

6. The one or more non-transitory computer-readable media of claim 1, wherein the sensor data comprises at least one of image data, signal strength, directional data, audio echo data, light intensity data, proximity data, and Wi-Fi data.

7. The one or more non-transitory computer-readable media of claim 1, wherein the acts further comprise:
determining whether the sensor data indicates that the proximity between the user device and a checkpoint device in the indoor environment is below a predetermined threshold; and
in response to the proximity that is below the predetermined threshold, determining the start position of the user device based at least on the proximity between the user device and checkpoint device.

8. A computer-implemented method, comprising:
using a combination of an image sensor, light intensity, Wi-Fi radio, and a proximity sensor to determine that a user device is within an indoor environment;
determining a start position of the user device based at least on the user device's proximity to known locations of one or more checkpoint devices in the indoor environment;
receiving an indication of an acceleration event at the start position and a deceleration event at a finish position associated with the user device that is located in the indoor environment;
determining a traveled distance of the user device based at least on an amount of time elapsed between the acceleration event and the deceleration event;
obtaining sensor data collected during the time elapsed and associated with the user device;
determining a direction of travel of the user device based at least on the sensor data;
mapping, using an architectural plan associated with the indoor environment, the finish position relative to the start position of the user device in the indoor environment based at least on the traveled distance and the direction of travel;
predicting, using crowdsourced data aggregated from multiple user devices in the indoor environment, distances between floors in the indoor environment;
appending the predicted distances between floors to the architectural plan associated with the indoor environment; and
identifying a floor level corresponding to the finish position of the user device based at least on:
the start position,
the predicted distances between the floor levels or the terminals,
the traveled distance of the user device, and
the direction of travel of the user device.

9. The computer-implemented method of claim 8, further comprising:
obtaining the architectural plan associated with the indoor environment;
identifying a number of floor levels in the indoor environment based at least on the architectural plan, wherein the number of floor levels is greater than one; and
determining distances between consecutive floor levels.

10. The computer-implemented method of claim 8, further comprising:
obtaining the architectural plan associated with the indoor environment;
identifying a number of terminals in the indoor environment based at least on the architectural plan, wherein the number of terminals is greater than one;
determining distances between consecutive terminals; and
identifying a terminal corresponding to the finish position based at least on the distances between the consecutive terminals, the traveled distance, and the direction of travel.

11. The computer-implemented method of claim 8, further comprising:
obtaining the architectural plan associated with the indoor environment;
identifying a number of terminals in the indoor environment based at least on the architectural plan, wherein the number of terminals is greater than one;
receiving the crowdsourced data indicative of traveled distances between the terminals from a plurality of user devices located in the indoor environment; and
identifying a terminal corresponding to the finish position based at least on the predicted distances between the consecutive terminals, the distance traveled, and the direction of travel.

12. The computer-implemented method of claim 8, further comprising:
   determining whether the time elapsed is below a predetermined threshold; and
   in response to the time elapsed that is below the predetermined threshold, determining that the start position is the same as the finish position.

13. The computer-implemented method of claim 8, wherein the sensor data comprises at least one of image data, signal strength, directional data, audio echo data, light intensity data, proximity data, and Wi-Fi data.

14. The computer-implemented method of claim 8, further comprising:
   obtaining the architectural plan associated with the indoor environment;
   identifying a location of a checkpoint device in the indoor environment based at least on the architectural plan, wherein a number of locations is greater than one;
   determining whether the sensor data indicates that the proximity between the user device and the checkpoint device is below a predetermined threshold; and
in response to the proximity that is below the predetermined threshold, establishing the start position as the location of the checkpoint device.

15. A system, comprising:
one or more non-transitory storage mediums configured to provide stored computer-readable instructions, the one or more non-transitory storage mediums coupled to one or more processors, the one or more processors configured to execute the computer-readable instructions to cause the one or more processors to:
   use a combination of an image sensor, light intensity, Wi-Fi radio, and a proximity sensor to determine that a user device is within an indoor environment;
   determine a start position of the user device based at least on the user device's proximity to known locations of one or more checkpoint devices in the indoor environment;
   receive an indication of an acceleration event at the start position and a deceleration event at a finish position associated with the user device that is located in the indoor environment;
   determine a traveled distance of the user device based at least on an amount of time elapsed between the acceleration event and the deceleration event;
   obtain sensor data collected during the time elapsed and associated with the user device;
   determine a direction of travel of the user device based at least on the sensor data;
   map, using an architectural plan associated with the user environment, the finish position relative to the start position of the user device in the indoor environment based at least on the traveled distance and the direction of travel;
   predict, using crowdsourced data aggregated from multiple user devices in the indoor environment, distances between floors in the indoor environment;
   append the predicted distances between floors to the architectural plan associated with the indoor environment; and
   identify a floor level corresponding to the finish position of the user device based at least on:
      the start position,
      the predicted distances between the floor levels or the terminals,
      the traveled distance of the user device, and
      the direction of travel of the user device.

16. The system of claim 15, wherein the one or more processors are further configured to execute the computer-readable instructions to cause the one or more processors to:
   determine whether the time elapsed is below a predetermined threshold; and
   in response to the time elapsed that is below the predetermined threshold, determine that the start position is the same as the finish position.

17. The system of claim 15, wherein the one or more processors are further configured to execute the computer-readable instructions to cause the one or more processors to:
   broadcast the finish position of the user device to an additional user device in response to an emergency notification associated with the indoor environment.

18. The system of claim 15, wherein the one or more processors are further configured to execute the computer-readable instructions to cause the one or more processors to:
   generate navigation instructions in the indoor environment based at least on a navigated route of the user device from the start position to the finish position.

* * * * *